US010969111B2

(12) United States Patent
Wiedemann et al.

(10) Patent No.: US 10,969,111 B2
(45) Date of Patent: Apr. 6, 2021

(54) METHOD FOR DISPLAYING PARAMETERS OF A COOKING PROCESS AND DISPLAY DEVICE FOR A COOKING APPLIANCE

(71) Applicant: Rational Aktiengesellschaft, Landsberg am Lech (DE)

(72) Inventors: Peter Wiedemann, Klosterlechfeld (DE); Jana Kirchgaessner, Bad Soden (DE); Sascha Barby, Hurlach (DE); Gerd Funk, Bickenbach (DE); Torsten Brinkmann, Stoettwang (DE); Bruno Maas, Wertach (DE); Frank Marek, Klosterlechfeld (DE); Anton Meindl, Keonigsbrunn (DE); Wilhelm Maerz, Siebnach (DE); Sonja Reich, Landsberg am Lech (DE); Leonora Minisini, Penzing (DE); Wolfgang Schmidberger, Landsberg am Lech (DE); Meike Stelljes, Munich (DE)

(73) Assignee: RATIONAL AKTIENGESELLSCHAFT, Landsberg am Lech (DE)

( * ) Notice: Subject to any disclaimer, the term of this patent is extended or adjusted under 35 U.S.C. 154(b) by 1208 days.

(21) Appl. No.: 14/415,272

(22) PCT Filed: Jul. 5, 2013

(86) PCT No.: PCT/EP2013/064303
§ 371 (c)(1),
(2) Date: Jan. 16, 2015

(87) PCT Pub. No.: WO2014/012806
PCT Pub. Date: Jan. 23, 2014

(65) Prior Publication Data

US 2015/0176846 A1 Jun. 25, 2015

(30) Foreign Application Priority Data

Jul. 16, 2012 (DE) ......................... 102012014174.2

(51) Int. Cl.
*F24C 7/08* (2006.01)
*A47J 27/62* (2006.01)
(Continued)

(52) U.S. Cl.
CPC ............. *F24C 7/082* (2013.01); *G09G 5/377* (2013.01); *G09G 5/38* (2013.01); *G09G 2340/0464* (2013.01); *G09G 2380/00* (2013.01)

(58) Field of Classification Search
CPC . F24C 7/082; A47J 27/62; G09G 5/38; G09G 5/377; G09G 2380/00; G09G 2340/0464
(Continued)

(56) References Cited

U.S. PATENT DOCUMENTS 3,997,752 A * 12/1976 Nakano .................. F24C 7/082 116/286
4,405,991 A * 9/1983 Stanley .................. F24C 7/082 219/704
(Continued)

FOREIGN PATENT DOCUMENTS

CN 1428540 A 7/2003
CN 1428551 A 7/2003
(Continued)

OTHER PUBLICATIONS

Opposition Writ issued in corresponding Patent No. EP2872830 dated May 25, 2016 (21 Pages).
(Continued)

*Primary Examiner* — Eric S Stapleton
(74) *Attorney, Agent, or Firm* — Hayes Soloway PC

(57) ABSTRACT

A method of displaying parameters of a cooking process involves a step in which an information window is provided
(Continued)

within an indicating window. Further, a cooking intelligence applied is temporarily displayed in the information window. A cooking appliance display device can be used for displaying various parameters and steps of a cooking process and for making these available to an operator for interaction, with an information window being provided in which a currently applied cooking intelligence is displayed.

6 Claims, 11 Drawing Sheets

(51) Int. Cl.
*G09G 5/377* (2006.01)
*G09G 5/38* (2006.01)

(58) Field of Classification Search
USPC .......... 99/342
See application file for complete search history.

(56) References Cited

U.S. PATENT DOCUMENTS

| | | | | | |
|---|---|---|---|---|---|
| 4,914,277 | A * | 4/1990 | Guerin | F24C 7/087 | 219/492 |
| 5,710,409 | A * | 1/1998 | Schwarzbacker | F24C 7/082 | 219/413 |
| 5,757,375 | A * | 5/1998 | Kawase | G09G 5/393 | 345/545 |
| 5,828,384 | A * | 10/1998 | Iwasaki | G09G 5/395 | 345/531 |
| 6,002,411 | A * | 12/1999 | Dye | G06F 12/08 | 345/532 |
| 6,004,208 | A * | 12/1999 | Takemoto | G07F 17/3211 | 463/20 |
| 6,161,126 | A * | 12/2000 | Wies | G05B 19/00 | 709/203 |
| 6,212,577 | B1 * | 4/2001 | Stern | G06F 3/0486 | 719/329 |
| 6,215,505 | B1 * | 4/2001 | Minami | G06T 11/00 | 345/473 |
| 6,245,984 | B1 * | 6/2001 | Aoki | G10H 1/0025 | 84/611 |
| 6,299,921 | B1 * | 10/2001 | Loffler | A47J 27/62 | 426/233 |
| 6,313,838 | B1 * | 11/2001 | Deering | G06T 15/00 | 345/420 |
| 6,510,782 | B1 * | 1/2003 | Blaschke | A47J 31/58 | 220/567.3 |
| 6,515,266 | B2 * | 2/2003 | Nasu | F24C 7/082 | 219/739 |
| 6,600,288 | B2 * | 7/2003 | Durth | F24C 15/325 | 219/756 |
| 6,661,424 | B1 * | 12/2003 | Alcorn | G06T 15/005 | 345/581 |
| 6,697,063 | B1 * | 2/2004 | Zhu | G06T 15/005 | 345/421 |
| 6,753,027 | B1 * | 6/2004 | Greiner | F24C 7/08 | 374/E7.042 |
| 6,922,693 | B1 * | 7/2005 | Rubin | G06F 17/211 | |
| 6,999,087 | B2 * | 2/2006 | Lavelle | G06T 15/005 | 345/503 |
| 7,057,142 | B1 * | 6/2006 | Lubrina | F24C 7/085 | 219/494 |
| 7,282,677 | B2 * | 10/2007 | Kang | H05B 6/6435 | 219/414 |
| 7,302,648 | B1 * | 11/2007 | Brunner | G06F 9/4443 | 715/788 |
| 7,369,134 | B2 * | 5/2008 | Collins | G06F 9/5016 | 345/530 |
| 7,378,620 | B2 * | 5/2008 | Lubrina | F24C 7/085 | 219/414 |
| 7,636,489 | B2 * | 12/2009 | Zimmer | G06T 5/20 | 382/254 |
| 7,675,513 | B2 * | 3/2010 | Holland | H04N 13/0275 | 345/418 |
| 7,782,334 | B1 * | 8/2010 | Kilgard | G06T 1/00 | 345/419 |
| 7,928,994 | B2 * | 4/2011 | Plut | G06F 9/4443 | 345/619 |
| 7,970,206 | B2 * | 6/2011 | Harris | G09G 5/02 | 382/162 |
| 7,978,194 | B2 * | 7/2011 | Seiler | G06T 15/405 | 345/421 |
| 8,107,010 | B2 * | 1/2012 | Putterman | H04N 5/44591 | 348/563 |
| 8,130,241 | B2 * | 3/2012 | Plut | G06F 9/4443 | 345/629 |
| 8,157,399 | B2 * | 4/2012 | Leung | F24C 7/082 | 362/602 |
| 8,284,836 | B2 * | 10/2012 | Birinov | H04N 19/61 | 348/719 |
| 8,300,699 | B2 * | 10/2012 | Stivers | G09G 5/003 | 345/501 |
| 8,447,141 | B2 * | 5/2013 | Barenbrug | G06T 7/507 | 358/3.26 |
| 8,492,681 | B2 * | 7/2013 | Satanek | F24C 7/082 | 219/506 |
| 8,555,776 | B2 * | 10/2013 | Murphy | F24C 7/086 | 99/342 |
| 8,976,297 | B2 * | 3/2015 | Putterman | H04N 5/44591 | 348/563 |
| 9,027,468 | B2 * | 5/2015 | Rhetat | A47J 27/0802 | 220/315 |
| 9,229,735 | B2 * | 1/2016 | Plut | G06F 9/4443 | |
| 2001/0009256 | A1 * | 7/2001 | Nasu | F24C 7/082 | 219/739 |
| 2001/0048435 | A1 * | 12/2001 | Deering | G06T 3/40 | 345/441 |
| 2002/0002587 | A1 * | 1/2002 | Kecik | H04N 9/3147 | 709/206 |
| 2002/0005862 | A1 * | 1/2002 | Deering | G06F 3/011 | 345/694 |
| 2003/0161922 | A1 * | 8/2003 | Hillmann | F24C 7/082 | 426/523 |
| 2003/0218614 | A1 * | 11/2003 | Lavelle | G06T 15/005 | 345/539 |
| 2004/0057600 | A1 * | 3/2004 | Niwa | B60R 25/104 | 382/103 |
| 2005/0015774 | A1 * | 1/2005 | Kotani | G06F 9/542 | 719/310 |
| 2006/0013933 | A1 * | 1/2006 | Fink | F24C 7/08 | 426/523 |
| 2006/0185810 | A1 * | 8/2006 | Juergens | A47J 39/006 | 162/234 |
| 2006/0289459 | A1 * | 12/2006 | Schmidt | A47J 27/62 | 219/497 |
| 2007/0000911 | A1 * | 1/2007 | Lubrina | F24C 7/085 | 219/506 |
| 2007/0022389 | A1 * | 1/2007 | Ording | G06F 3/0481 | 715/790 |
| 2007/0158335 | A1 * | 7/2007 | Mansbery | F24C 7/082 | 219/505 |
| 2007/0211174 | A1 * | 9/2007 | Putterman | H04N 5/44591 | 348/588 |
| 2008/0012880 | A1 * | 1/2008 | Plut | G06F 9/4443 | 345/660 |
| 2008/0143739 | A1 * | 6/2008 | Harris | G09G 5/02 | 345/604 |
| 2008/0264269 | A1 * | 10/2008 | Sterzel | F24C 7/08 | 99/331 |
| 2008/0267452 | A1 * | 10/2008 | Kondo | G06K 9/4647 | 382/103 |
| 2008/0295702 | A1 * | 12/2008 | Wiedemann | H05B 6/6435 | 99/325 |
| 2009/0020021 | A1 * | 1/2009 | Rhetat | A47J 27/0802 | 99/342 |
| 2009/0121970 | A1 * | 5/2009 | Ozbek | D06F 37/28 | 345/4 |

(56) References Cited

U.S. PATENT DOCUMENTS

| | | | | |
|---|---|---|---|---|
| 2010/0085207 | A1* | 4/2010 | Leung | F24C 7/082 340/6.1 |
| 2010/0147823 | A1* | 6/2010 | Anderson | F24C 7/082 219/391 |
| 2010/0196561 | A1* | 8/2010 | Kling | F24C 7/08 426/233 |
| 2010/0251168 | A1* | 9/2010 | Fujita | G06F 3/0483 715/790 |
| 2010/0281423 | A1* | 11/2010 | Kano | G06F 3/0481 715/794 |
| 2011/0148920 | A1* | 6/2011 | Plut | G06F 9/4443 345/629 |
| 2011/0149016 | A1* | 6/2011 | Kimura | H04N 5/232 348/36 |
| 2011/0298936 | A1* | 12/2011 | Watanabe | H04N 5/23219 348/208.4 |
| 2012/0027904 | A1* | 2/2012 | Lim | F24C 7/082 426/523 |
| 2012/0124510 | A1* | 5/2012 | Plut | G06F 9/4443 715/798 |
| 2012/0169934 | A1* | 7/2012 | Putterman | H04N 5/44591 348/565 |
| 2012/0249597 | A1* | 10/2012 | Yoshida | G06F 3/14 345/660 |

FOREIGN PATENT DOCUMENTS

| | | | |
|---|---|---|---|
| CN | 101263344 | A | 9/2008 |
| CN | 102200307 | | 9/2011 |
| CN | 202040863 | U | 11/2011 |
| DE | 4217943 | A1 | 12/1993 |
| DE | 19718399 | A1 | 11/1998 |
| DE | 202004000087 | U1 | 4/2004 |
| DE | 10342531 | A1 | 4/2005 |
| DE | 102004061304 | A1 | 6/2006 |
| DE | 102005043216 | A1 | 3/2007 |
| DE | 102006030643 | A1 | 1/2008 |
| DE | 102006057923 | A1 | 6/2008 |
| DE | 102007040316 | A1 | 2/2009 |
| DE | 102008014006 | A1 | 9/2009 |
| DE | 102008025985 | A1 | 12/2009 |
| DE | 102008027597 | A1 | 12/2009 |
| DE | 102008032451 | A1 | 2/2010 |
| DE | 102008051265 | A1 | 4/2010 |
| DE | 102010016473 | A1 | 10/2011 |
| DE | 102010060295 | A1 | 5/2012 |
| DE | 102010055983 | A1 | 6/2012 |
| EP | 1741989 | A2 | 1/2007 |
| EP | 1758000 | A1 | 2/2007 |
| EP | 2159488 | A1 | 3/2010 |
| EP | 2363646 | A1 | 9/2011 |
| KR | 20030063082 | A | 7/2003 |
| WO | 2009026877 | A2 | 3/2009 |
| WO | 2009026895 | A2 | 3/2009 |
| WO | 2009152802 | A2 | 12/2009 |

OTHER PUBLICATIONS

Wikipedia printout “Temporär” dated May 24, 2010 (1 Page).
German receipt from Miele for oven H383-1 dated Feb. 1, 2002 (1 Page).
German instruction manual excerpt for Miele oven H383 (3 Pages).
German complete instruction manual for Miele H383 (88 Pages).

* cited by examiner

METHOD FOR DISPLAYING PARAMETERS OF A COOKING PROCESS AND DISPLAY DEVICE FOR A COOKING APPLIANCE

The invention relates to a method of displaying parameters of a cooking process. The invention further relates to a cooking appliance display device.

BACKGROUND OF THE INVENTION

Modern cooking appliances for professional use, such as, e.g., in company canteens and restaurants, are adapted to run a multitude of cooking programs in an automated fashion in order to cook different foods in a reproducible manner. An operator can choose here among the different programs and, furthermore, can make specifications with respect to the desired final state of the cooked product. For example, a "roast pork" cooking program may be selected in which the roast pork will have the desired core temperature and also a crispy crackling at the end of the cooking program.

It is known from the prior art that the cooking appliances which are suitable for such cooking programs to be carried out display various information to the user about the course and the progression of the cooking procedure. Here, the most important parameter is most likely the remaining run time or the target time of the cooking program, for the operator to know when cooking of the product will be completed. In view of the complexity of the cooking programs that are offered by modern cooking appliances, however, it is not easy to provide the essential information in a clearly laid-out manner to the operator, who needs this information for operating the cooking appliance and integrating the cooking appliance into the other processes in the kitchen, on the one hand, and to explain to the operator, with the aid of information, which steps are currently in progress in the cooking process, on the other hand. This is relevant in particular in intelligent cooking processes in which the cooking process is automatically modified on the basis of acquired parameters in order to reach the result desired by the operator. For example, based on the profile of the core temperature, the cooking appliance can detect whether, for the "roast pork" example considered here, a large or a small caliber is present in the cooking chamber. The cooking duration and/or the cooking chamber temperature can be adjusted accordingly. Such adjustments should be communicated to the operator in a clearly structured manner here, since otherwise it is quite hard to understand why, for example, a remaining cooking duration of 2 hours is indicated at the start of the cooking process, whereas, after the first 20 minutes of the cooking process have passed, suddenly a remaining cooking duration of 2 hours and 15 minutes was calculated. The displays known so far for cooking appliances are not able to offer the required information to an operator in a clearly laid-out fashion.

The object of the invention consists in providing a method of displaying parameters as well as a display device which allow a user to keep track of the cooking process that is currently in progress and thus to fully understand the cooking process, in spite of the multiplicity of information involved in modern, in particular intelligent, cooking appliances during operation.

BRIEF DESCRIPTION OF THE INVENTION

To achieve this object, according to the invention provision is made for a method of displaying parameters of a cooking process, in which an information window is provided within an indicating window, a cooking intelligence applied being temporarily displayed in the information window. Further provided is a cooking appliance display device by means of which various parameters and steps of a cooking process are displayed and made available to an operator for interaction, characterized in that an information window is provided in which a currently applied cooking intelligence is displayed.

The invention is based on the finding that the cooking intelligences applied in an intelligent cooking process may cause confusion for the users since they can not comprehend why and in which way such a cooking intelligence influences and changes the cooking process.

"Cooking intelligence" in this connection means an alteration, proceeding in an automated manner, in the cooking process based on an automatic detection of an parameter, the alteration in the cooking process being calculated by the controller of the cooking appliance as a function of the parameter ascertained. A cooking appliance having a cooking intelligence independently checks specific parameters at regular intervals by means of sensors and adjusts the cooking chamber climate and/or controls appliance functions in order to reach the target specifications, irrespectively of the starting point of the food to be cooked. One simple example of a cooking intelligence is an adaptation of the cooking time (or target time) as a function of the detected caliber of a piece of meat to be cooked. If the cooking intelligence applied is displayed, as is provided according to the invention, it is comprehensible to an operator why "suddenly", that is, after the caliber has been recognized, a later finishing time is displayed for the current cooking process than at the beginning of the cooking process.

Preferably, provision is made that other information within the indicating window is visually moved to the background when a cooking intelligence is displayed. In this way, the operator's attention is immediately directed to the currently applied cooking intelligence; the possibly very large number of other items of information, which currently are not so relevant, are "masked".

In order to directly clearly illustrate the effect of the currently applied cooking intelligence to an operator, a temporarily applied cooking intelligence may be visually linked to a cooking process parameter displayed which is influenced by this cooking intelligence. For example, a caliber recognition may be linked to the cooking duration and/or the time of completion of the cooking process.

An arrow, a luminous band, marker points or successively activated points may be used for the visual linking. This allows a kind of visual road to be formed which leads from the cooking intelligence to the parameter influenced by it.

The clarity and overview of the entire cooking process can be increased if cooking intelligences to be applied in the further course of the cooking process are displayed in a display field. The display field then constitutes a preview area from which the operator can obtain information about which cooking intelligences will still be applied in the further course of the cooking process.

For an improved clarity, provision may also be made that cooking intelligences already applied in the cooking process in progress are displayed in a display field. This display field constitutes a filing folder from which the operator can see which cooking intelligences were already "executed".

According to a preferred embodiment, provision is made that the information window is displayed at different positions within the indicating window as a function of at least one cooking process parameter. This allows additional information to be offered such that it can be intuitively grasped.

Preferably, provision is made that the distance of the information window from the lower edge of the indicating window depends on the temperature, more particularly is substantially proportional to the temperature. In this way, an operator can immediately see whether the cooking is at present carried out at a high temperature or at a low temperature. In addition, the temperature used can be precisely indicated in a temperature display.

According to a preferred embodiment, provision is made that a bar is displayed between the information window and the lower edge of the indicating window, the bar containing information about the currently used cooking chamber atmosphere. Apart from providing the additional information about the cooking chamber atmosphere, which is offered in a clearly laid-out fashion, the bar may also serve to visually divide the indicating window into different areas that are associated with different phases of the cooking process. An area located to the left of the bar may be associated with the already finished cooking process steps and cooking intelligences; an area located to the right of the bar may be associated with the cooking process steps and cooking intelligences still to be carried out; and the middle area, formed by the bar, of the indicating window may be used for displaying the cooking process step currently in progress and the currently applied cooking intelligence.

BRIEF DESCRIPTION OF THE DRAWINGS

The invention will be described below with reference to various embodiments which are illustrated in the accompanying drawings, in which.

DETAILED DESCRIPTION OF THE INVENTION

Figure 1:
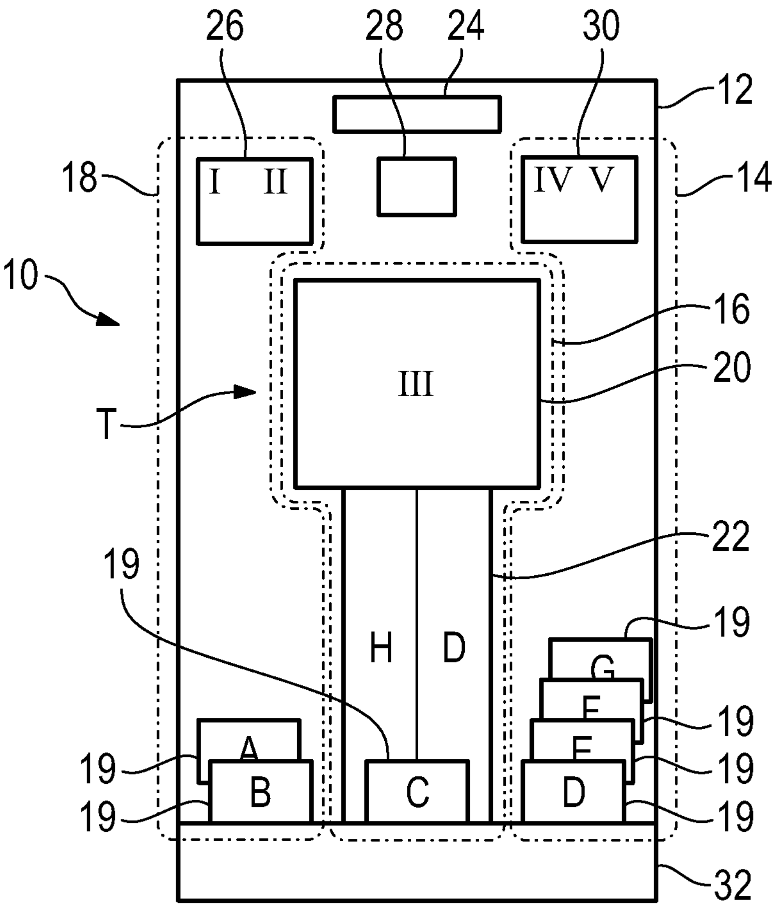
FIG. 1 shows a display device according to a first embodiment in a first state.

FIG. 1 shows a display device 10 which includes an indicating window 12 having three display areas provided thereon, more specifically a Preview area 14, a Now area 16, and a Finished area 18. In general terms, the Now area is a middle area of the indicating window, which extends from the top to the bottom. The Preview area is the right-hand vertical edge section of the indicating window, and the Finished area is the left-hand vertical edge section of the indicating window.

The cooking process steps of a selected cooking process which still have to be executed are displayed in the form of fields 19 in the Preview area 14. Steps D, E, F and G are schematically indicated here. The cooking process step that is currently in progress is indicated in the Now area 16. Here, this is step C. The cooking process steps which have already been executed, that is, here steps A and B, are indicated in the Finished area 18.

An information window 20 in the Now area is assigned to the cooking process step that is currently in progress, the information window 20 being displayed at a variable distance from a base level. Here, the base level is determined by the level at which the cooking process step currently in progress is indicated. All the information that is relevant in connection with the cooking process step currently in progress can be indicated in the information window 20. This is, more particularly, information that is indicated in the form of text, images or combined information T and which relates to the cooking intelligence of the cooking process, that is, corrections that proceed in an automated fashion. For example, the fact that the cooking duration was adjusted based on the detected caliber of the food to be cooked could be displayed in the information window 20 (cooking intelligence III).

To enable an operator to obtain additional, more detailed information relating to a currently applied cooking intelligence, a pop-up function may be provided. Supplemental explanations about correlations and effects of the cooking intelligence that is currently being applied will appear upon request, for example by pushing a button or selecting a field.

A bar 22 is defined between the cooking process step currently in progress indicated in the Now area 16 and the information window 20 and constitutes a visual separation between the Preview area 14 and the Finished area 18. But the bar 22 not only serves to establish a direct connection between the cooking process step currently in progress and the information window 20, but the bar 22 is also used for displaying the current operating mode, for example hot air, steam, or a combination of hot air and steam. For an operating mode involving a combination of hot air and steam, the bar 22 may be made to be divided, for example, as is shown in FIG. 1. Depending on the steam proportion, the bar is displayed with a symbol H for hot air and a symbol D for steam.

Provided in the upper area of the indication window 12 are two display fields 26, 30, the display field 30 being arranged in the Preview area 14 and the display field 26 in the Finished area. These two display fields 26, 30 are used for displaying the cooking intelligences still to be applied in the further course of the cooking process (these are schematically represented as cooking intelligences IV and V in the display window 30) and the cooking intelligences already applied (these are schematically represented as cooking intelligences I and II in the display window 26).

Additionally, further display fields 24 and 28 may be provided, in which further relevant information can be indicated. For instance, the designation of the current cooking process, such as "pork roast with crackling", for example, may be displayed in the display field 24. The remaining cooking duration of the cooking process in progress may, for example, be indicated in the central display field 28.

Provided below the indicating window 12 is an information window 32 in which supplementary information can be presented. Here, a start button for starting a selected cooking process may be provided, or information about the remaining operating time until a cleaning cycle is recommended.

The display device 10 may be configured as a touch display, so that various selections can be made directly by touching the surface of the display device. Alternatively or additionally, a further input element may be provided, such as, e.g., a control wheel.

In a cooking process in progress, all individual cooking process steps of the selected cooking process are displayed in the Preview area. As soon as a particular step starts, its field 19 is shifted to the Now area 16 and displayed as a cooking process step currently in progress. At the same time, that information that is related to the cooking process step currently in progress can be displayed in the information window 20. As soon as the cooking process step currently in progress has been executed, it is shifted to the Finished area 18, and the next cooking process step "slides" to the Now area 16.

By analogy with the various cooking process steps, the currently relevant cooking intelligences are shifted from the display field 30 in the Preview area 14 to the Now area 16 and from there, once the associated cooking process step has been executed, they are shifted to the display field 26 in the Finished area.

Figure 2:
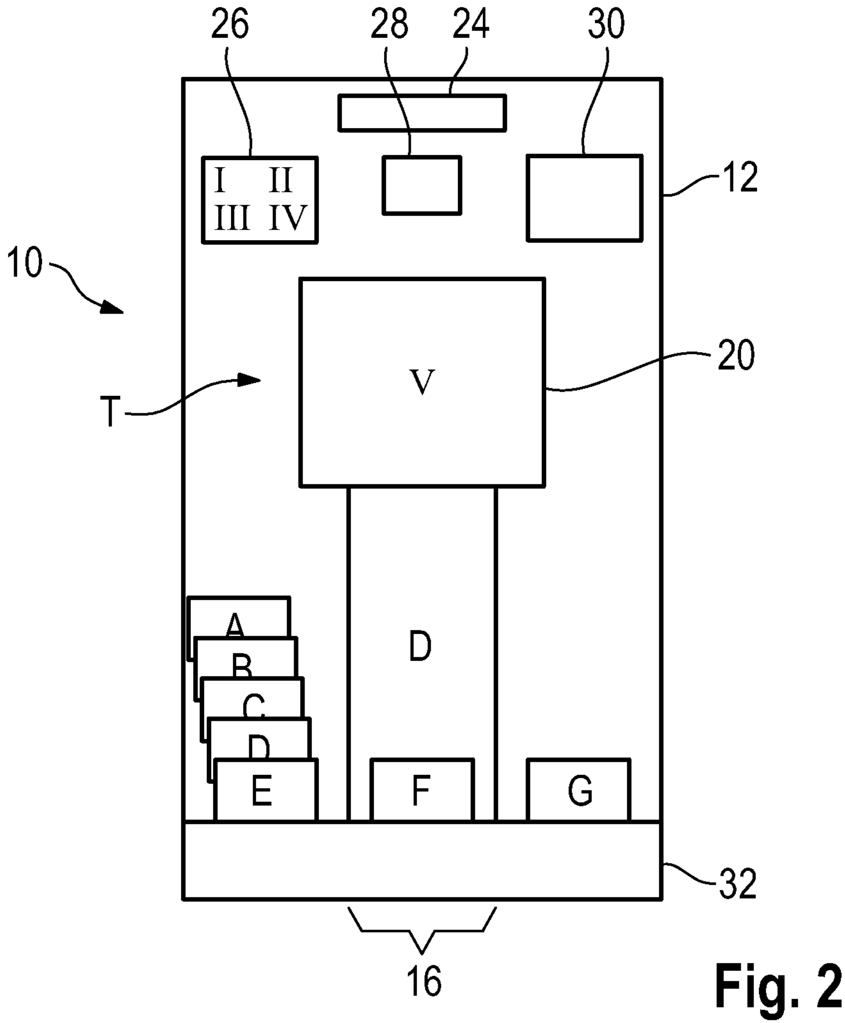
FIG. 2 shows the display device of FIG. 1 in a second state.

FIG. 2 shows the display device of FIG. 1, with the last cooking process step but one being currently in progress. A comparison with FIG. 1 shows that the information window 20 is now positioned at a very much lower level than in FIG. 1. An operator will immediately see from this that currently a lower cooking chamber temperature is used. In addition, the bar 22 is now completely realized with the symbol for steam, so that the operator will know that an operating mode with a maximum steam proportion is currently used.

It can also be seen that, meanwhile, the last cooking intelligence is active. All earlier cooking intelligences are located in the Finished area 18, and the Preview area 14 no longer displays any cooking intelligence.

Figure 3:
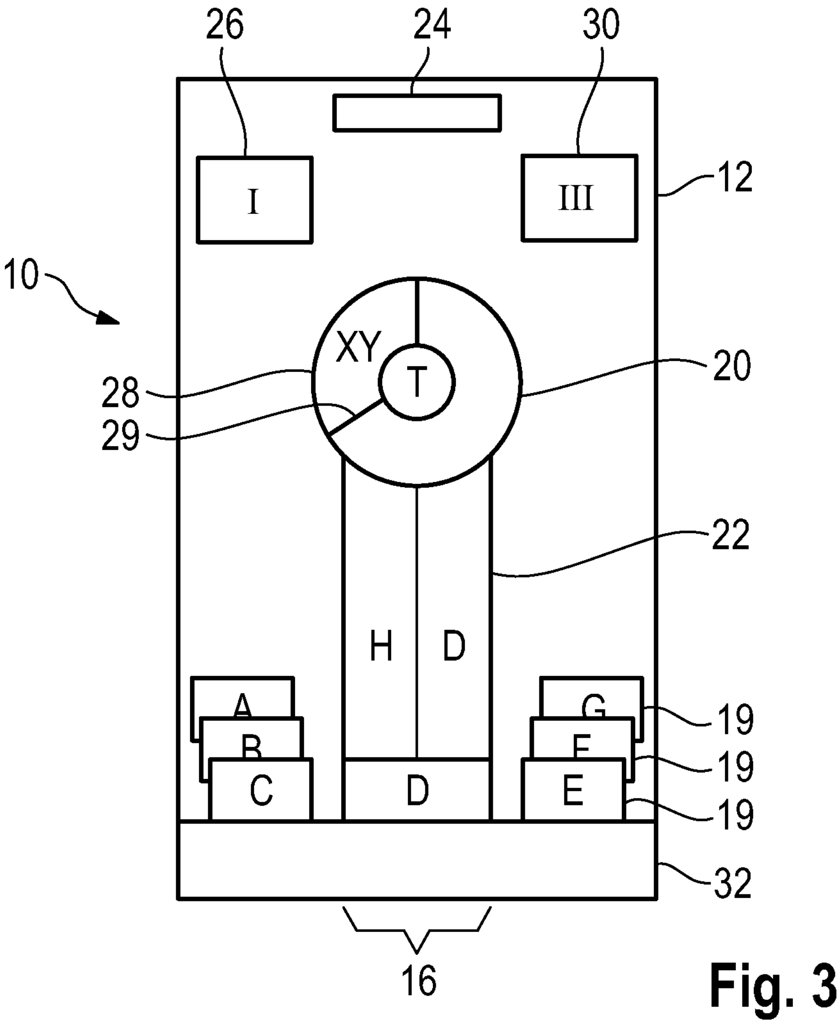
FIG. 3 shows a display device according to a second embodiment of the invention in a first state.
Figure 4:
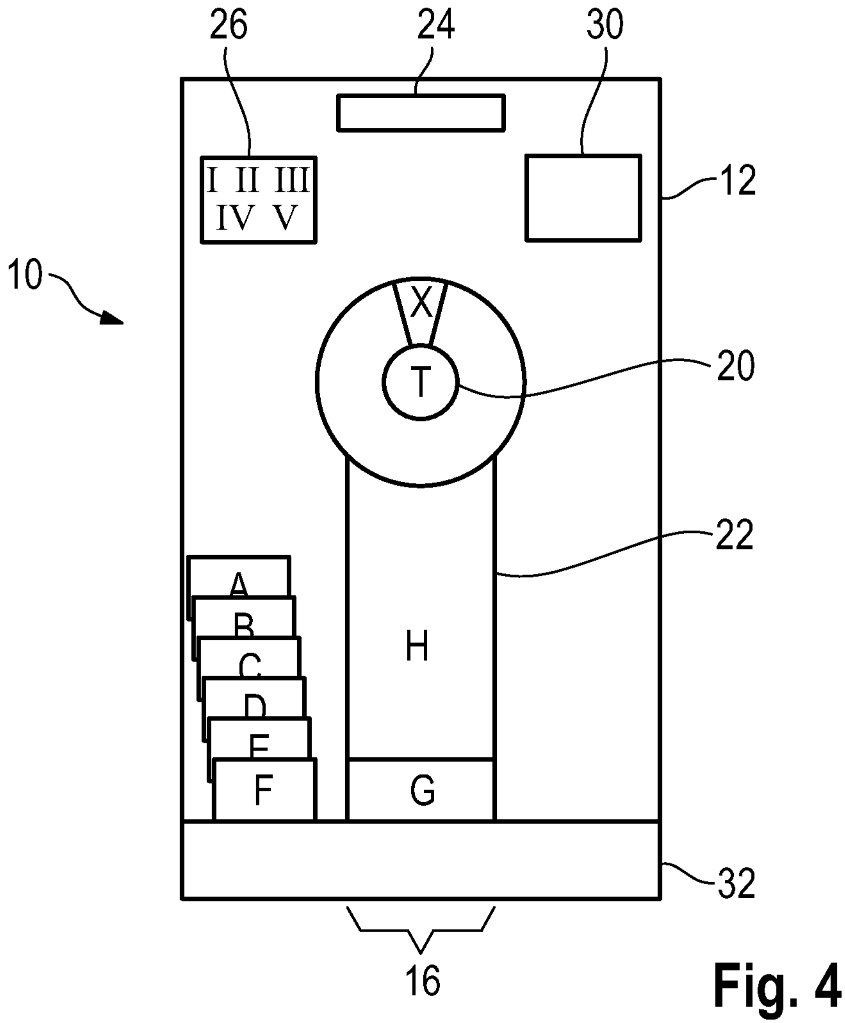
FIG. 4 shows the display device of FIG. 3 in a second state.

FIGS. 3 and 4 show a second embodiment. The same reference numerals are used for the features known from the first embodiment, and in this respect, reference is made to the explanations above.

The difference between the first and second embodiments consists in that in the second embodiment, the display field 28 for the remaining cooking duration is integrated in the information window 20. Similar to a running timer, the remaining cooking duration may be depicted in the nature of a segment of a circle, in which the distance between a "hand" 29 and an end position in the 12 o'clock position decreases. Additionally, the remaining cooking duration may also be explicitly indicated (see the symbolized displays xy and x in FIGS. 3 and 4, respectively). Furthermore, similar to the first embodiment, a specific text information T may be displayed within the display of the remaining cooking duration, which is related to the cooking process step currently in progress, for example a correction that is currently being made by a cooking intelligence.

In the same way as in the first embodiment, the display field 28 is shown at a variable distance from a base level (see a comparison of FIGS. 3 and 4), and the bar 22 is used for graphically depicting the operating mode currently in use.

Figure 5:
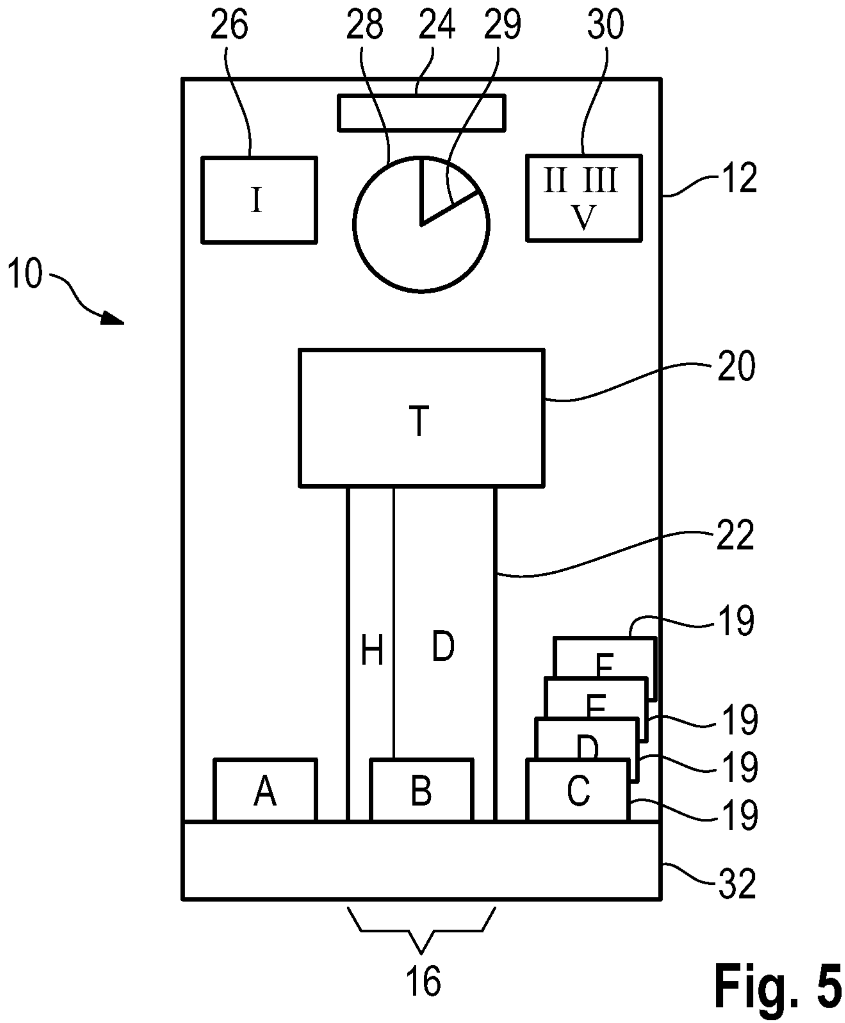
FIG. 5 shows a display device according to a third embodiment of the invention in a first state.
Figure 6:
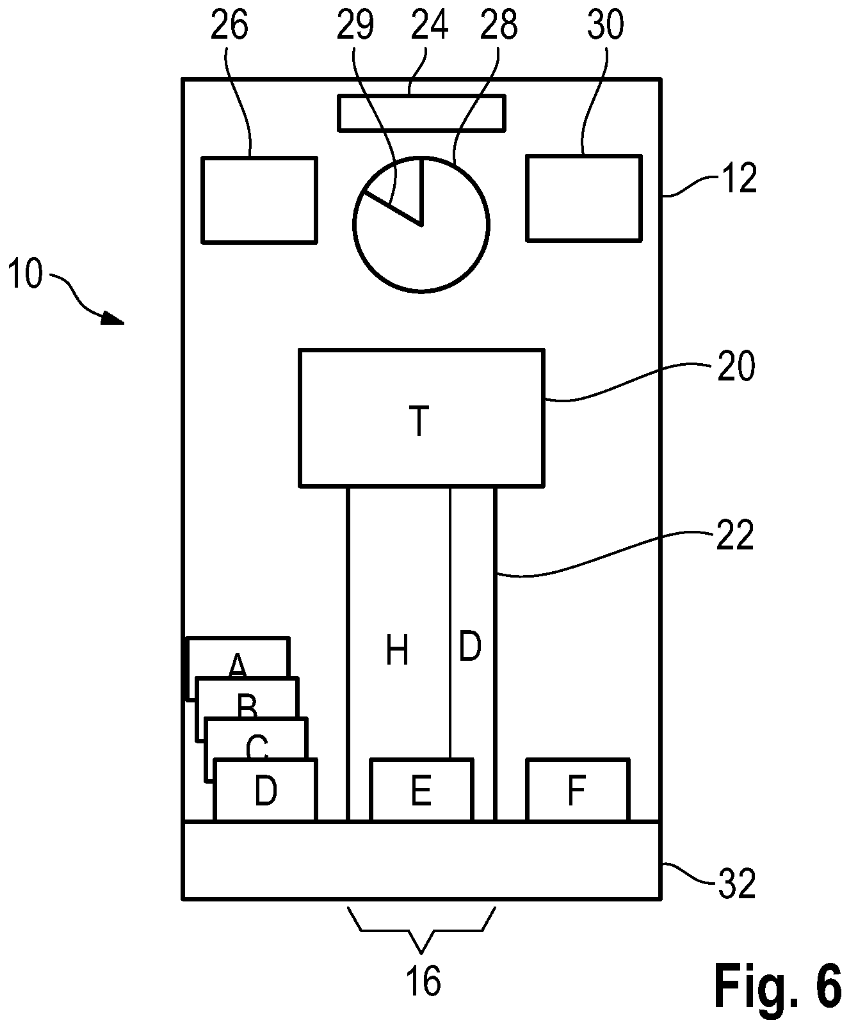
FIG. 6 shows the display device of FIG. 5 in a second state.

FIGS. 5 and 6 show a third embodiment. The same reference numerals are used for the features known from the preceding embodiments, and in this respect, reference is made to the explanations above.

In the third embodiment, the information window 20 is configured in the same way as is the case in the first embodiment. This means that a text information T is specifically shown at a variable distance from a base level. Further, the bar 22 extending between the information window 20 and the base level is used for displaying the current operating mode. Similar to the first embodiment, the remaining cooking duration is indicated in a separate display field 28, which, however, similar to the second embodiment, is configured in the nature of a clock which indicates the remaining residual cooking time by means of a hand 29 that approaches the 12 o'clock position clockwise as the cooking process proceeds.

Figure 7:
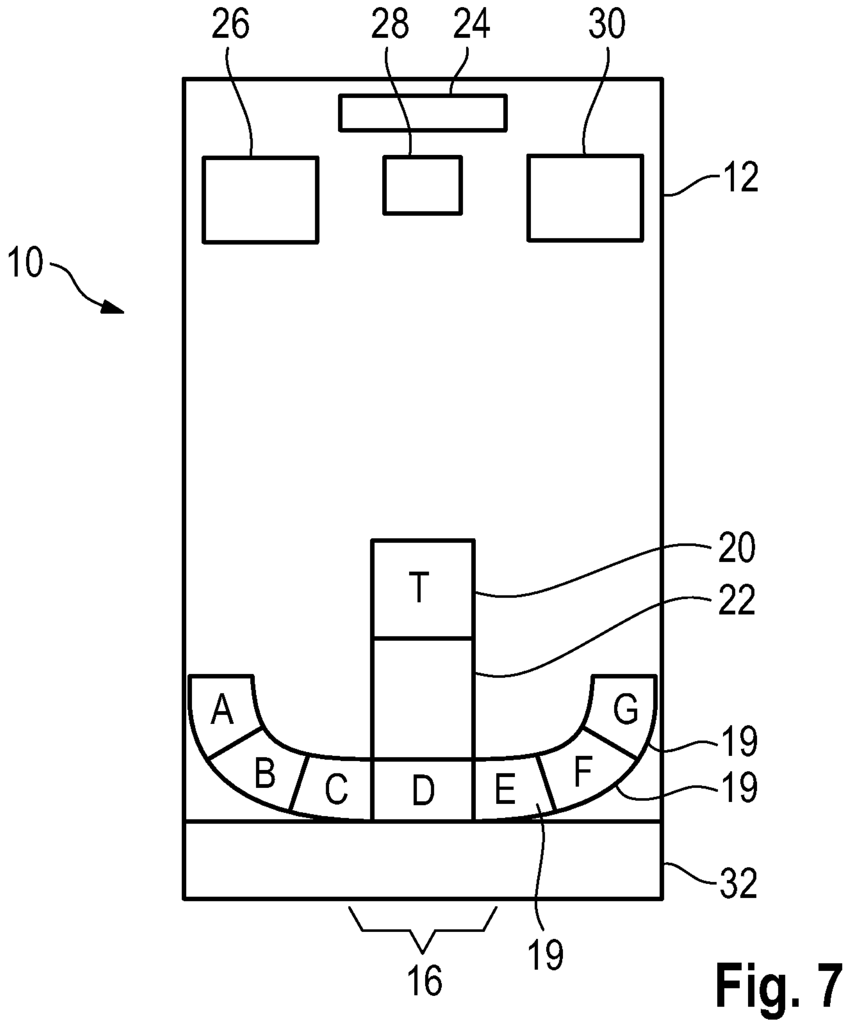
FIG. 7 shows a display device according to a fourth embodiment of the invention.

FIG. 7 shows a fourth embodiment. It is based on the first embodiment, the various cooking process steps of the cooking process, however, being indicated in a different manner. The fourth embodiment does not use any separate fields which are shifted from the Preview area 14 via the Now area 16 to the Finished area 18, similar to index cards, but the cooking process steps are configured as contiguous fields of a continuous process queue or line. The process queue, with its fields 19, moves from the Preview area 14 to the Finished area 18, the process step currently in progress being located in the Now area below the bar 22.

Figure 8:
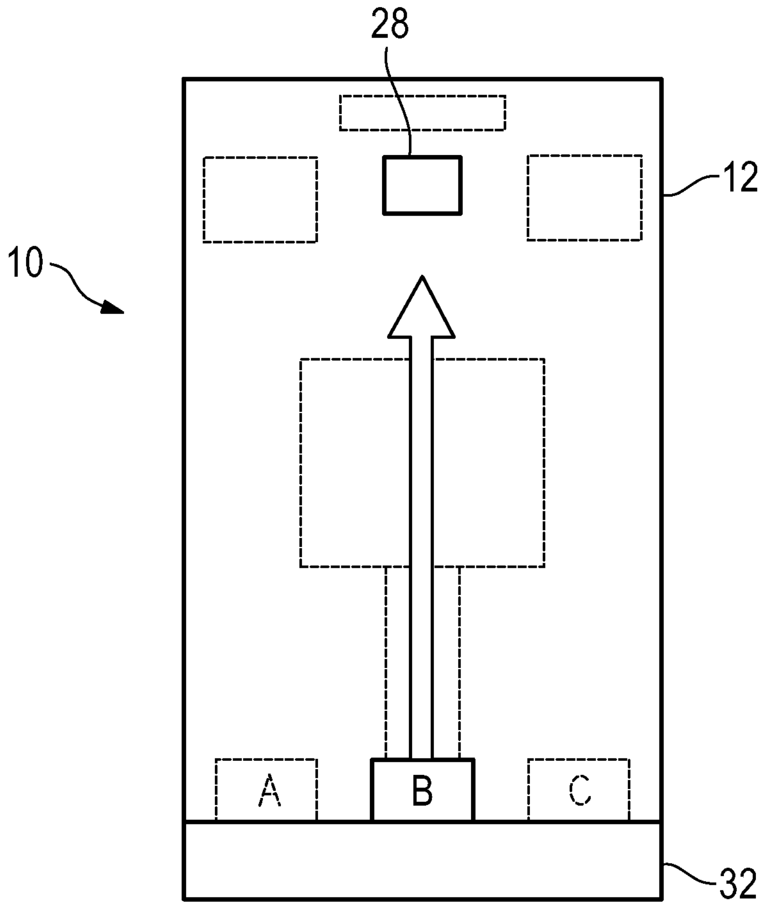
FIG. 8 shows a display device according to the invention in a transition state.

FIG. 8 shows a state of the display device 10 which can be selected when specific parameters are currently changed based on cooking intelligences in progress. In the illustrated example, the cooking process step B has resulted in that the remaining cooking duration indicated in the display field 28 was modified (cooking intelligence II). This is directly highlighted to an operator in that, apart from the cooking process step B currently in progress and the display field 28, all the other information has become visually unobtrusive, that is, is pushed to the background (which is indicated here in that the remaining fields are shown in dashed lines), and that a well visible arrow extends from the cooking process step B currently in progress to the display field 28. As an alternative, that information which is not relevant at the moment may be visually taken back in that it is grayed out.

Figure 9:
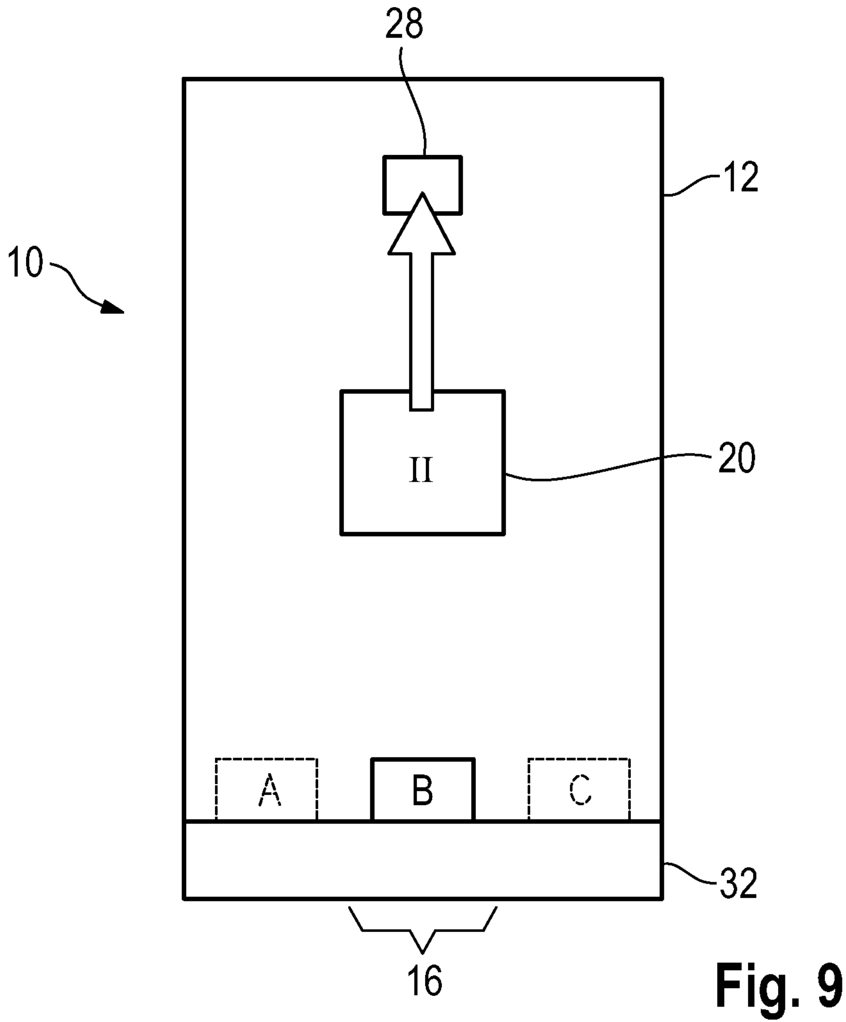
FIG. 9 shows a display device according to the invention in a second transition state.

The linking between the cooking intelligence and the changed parameter may also proceed from the cooking intelligence, as is shown in FIG. 9, where the fact is symbolized that the remaining cooking duration was changed on the basis of the cooking intelligence II currently applied. The visual linking may be effected by means of an arrow, a chain of marker points, a luminous band, or moving points, for example in the nature of successively activated LEDs. At the same time, the further information can be "masked", that is, shown in gray, for example, in order to direct the operator's focus on the effect of the cooking intelligence.

Figure 10:
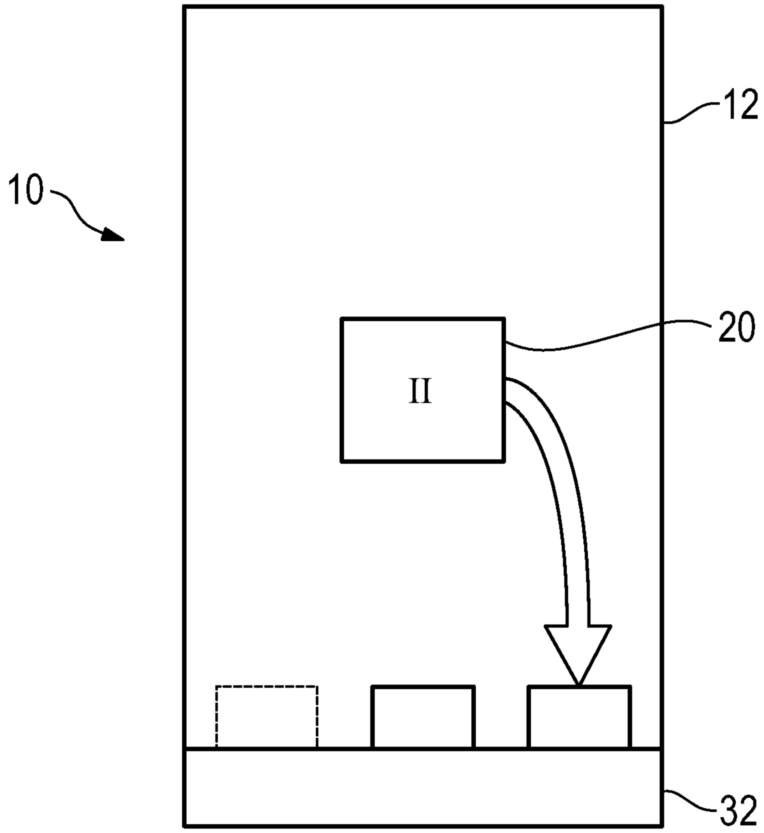
FIG. 10 shows a display device according to the invention in a third transition state.

The cooking intelligences applied may also have more far-reaching effects than a mere modification of cooking parameters. It is also possible for cooking process steps to be newly added, for example when a caliber detection leads to the finding that a further cooking process step is necessary due to a particularly large caliber. This may also be indicated by means of the display device, as shown in FIG. 10. Here, a signal is given to an operator by an arrow or similar visual markings that a further cooking process step was incorporated into the process chain.

Figure 11:
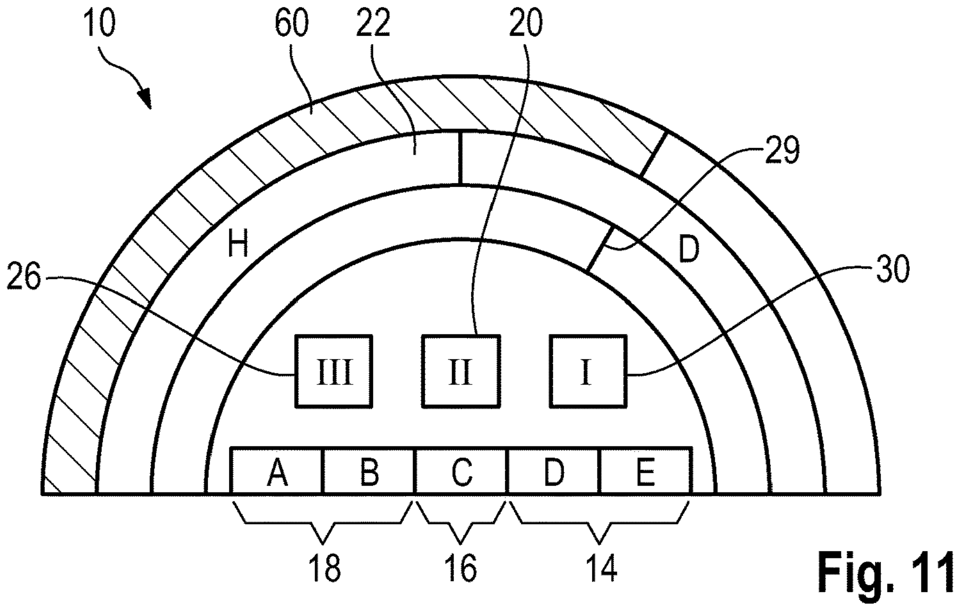
FIG. 11 shows a display device according to a fifth embodiment of the invention.

FIG. 11 shows a further embodiment of a display device 10. The indicating window here has a semicircular shape, with three different displays being arranged next to each other along the curved outer edge. On the very outside, there is a display for the temperature. Based on the angular range over which an area 60 extends, which, for example, is emphasized in terms of color, an operator can instantly and intuitively perceive whether at present a high cooking chamber temperature or a low cooking chamber temperature is used. It is also possible to adapt the color of the area, for example blue for low temperature and red for high temperature.

Located directly within the temperature display is the bar 22 which symbolizes the cooking chamber atmosphere and which has a curved shape here. Arranged again directly within is a symbolized display of the remaining cooking duration, which uses the hand 29 already known from the second or the third embodiment. The hand moves, for example, from the very right at the start of the cooking process via the middle to the left. Arranged centrally below these displays are the Preview area 14, the Now area 16 and the Finished area 18, which indicate the various cooking process steps. Further provided are display fields 30, 20 and 26 for indicating the cooking intelligences.

Figure 12:
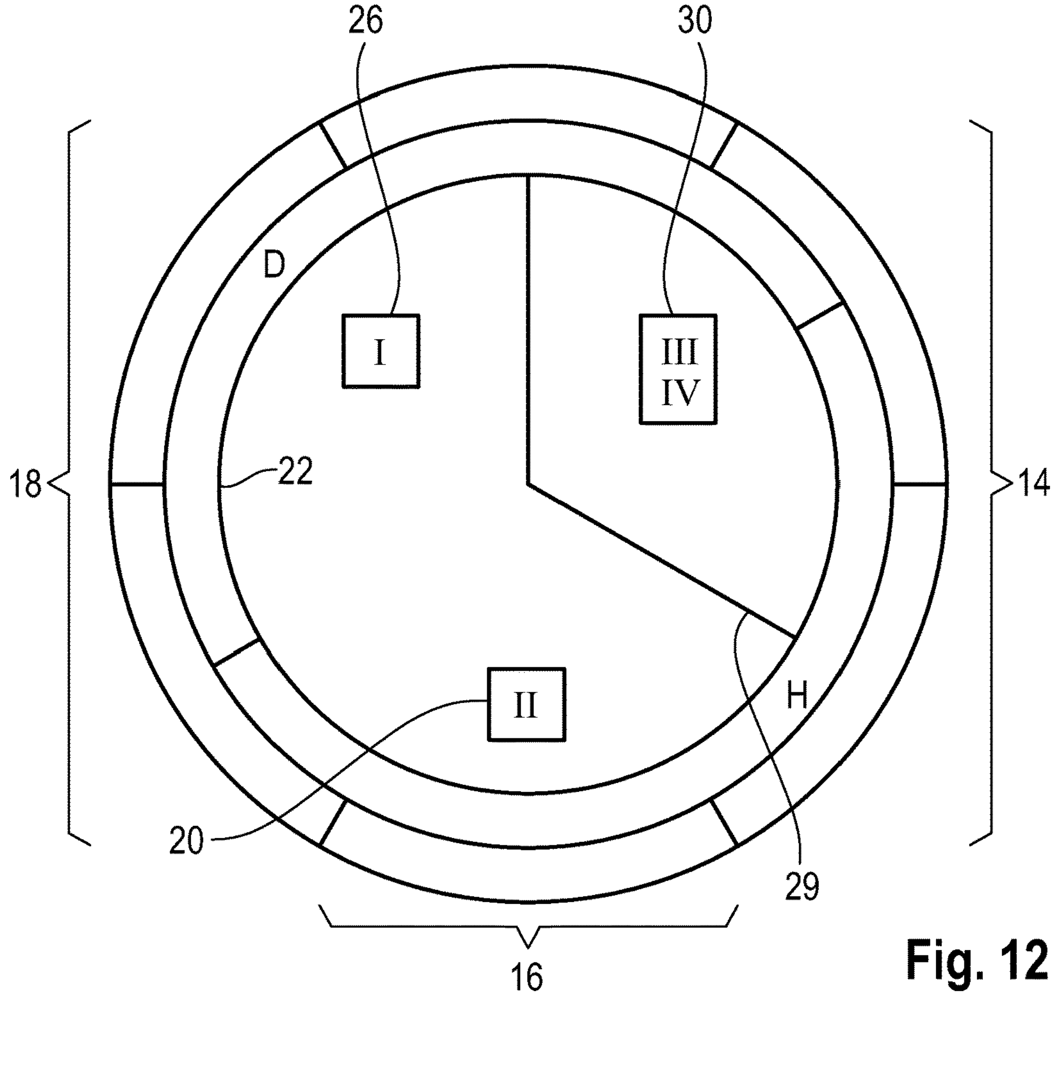
FIG. 12 shows a display device according to a sixth embodiment.

FIG. 12 shows a sixth embodiment, in which the display device is realized in the form of a circle. Here, too, a Preview area 14, a Now area 16 and a Finished area 18 are defined. The various cooking process steps are configured along the periphery of the display device and are shifted there between the different areas 14, 16, 18. Analogously to this, the cooking intelligences are shifted from the display field 30 via the information window 20 to the display field 26. The display of the remaining cooking duration is effected by means of a hand 29 here as well.

Deviating from the embodiments shown, the display fields 26, 30 may also be arranged at other places of the display window, such as, e.g., all on one side.

Furthermore, provision may be made that not all steps still to be executed and not all finished steps are displayed in the Preview area and the Finished area, respectively, but, for the sake of greater clarity, only a few or only the respective next step or the last step executed, respectively.

In all of the embodiments, when the currently applied cooking intelligence is displayed, it may also be indicated in the information window 20 which "finding" the cooking intelligence has obtained based on the sensors queried by it. It may be specified, for example (in the form of a pictogram, in plain writing or in some other form), which caliber has been detected, that a partial load was detected, that a particular state of the food was detected, such as, e.g., deep-frozen), that a particular product was detected, etc. This increases the acceptance by the operator since he/she can make sure that the adaptation of the cooking process parameters occurs on the basis of product properties that were recognized by the cooking appliance correctly.

The invention claimed is:

1. A method of displaying parameters of a cooking process, the method comprising the steps of displaying information window within an indicating window and displaying a cooking intelligence applied temporarily in said information window, wherein said information window is displayed at different positions within said indicating window as a function of at least one parameter of said cooking process.

2. The method of claim 1 wherein a distance of said information window from a lower edge of said indicating window depends from a temperature and particularly is substantially proportional to said temperature.

3. The method of claim 1 wherein a bar is displayed between said information window and said lower edge of said indicating window, said bar containing information related to an atmosphere currently used in a cooking chamber.

4. A cooking appliance display device in which various parameters and steps of a cooking process are displayed and made available to an operator for interaction, wherein an information window is provided within an indicating window and currently applied cooking intelligence is displayed in said information window, wherein said information window is displayed at different positions within said indicating window as a function of at least one parameter of said cooking process.

5. The display of claim 4 wherein a distance of said information window from a lower edge of said indicating window depends from a temperature and particularly is substantially proportional to said temperature.

6. The display of claim 4 wherein a bar is displayed between said information window and said lower edge of said indicating window, said bar containing information related to an atmosphere currently used in a cooking chamber.

* * * * *